United States Patent
Roesner

(10) Patent No.: US 10,062,025 B2
(45) Date of Patent: Aug. 28, 2018

(54) SWITCHABLE RFID TAG

(75) Inventor: Bruce B. Roesner, Durham, NC (US)

(73) Assignee: NEOLOGY, INC., San Diego, CA (US)

( * ) Notice: Subject to any disclaimer, the term of this patent is extended or adjusted under 35 U.S.C. 154(b) by 0 days.

(21) Appl. No.: 13/416,706

(22) Filed: Mar. 9, 2012

(65) Prior Publication Data
US 2013/0238405 A1 Sep. 12, 2013

(51) Int. Cl.
*G06K 19/06* (2006.01)
*G06K 19/073* (2006.01)
*G06K 19/07* (2006.01)

(52) U.S. Cl.
CPC ... *G06K 19/07327* (2013.01); *G06K 19/0723* (2013.01); *G06K 19/07345* (2013.01)

(58) Field of Classification Search
CPC ............ G06K 19/072; G06K 19/0723; G06K 19/0724; G06K 19/0725; G06K 19/0726; G06K 19/0727; G06K 19/07327; G06K 19/07345; G06K 19/07749; G06K 19/077; G06K 19/07309; G06K 19/07; G07B 15/063; G07B 15/02; G07F 7/1008; H01Q 1/2208; H01Q 1/2216; H01Q 1/2225; G08B 13/08
USPC ......... 705/13, 1.1; 235/492, 382; 340/572.1, 340/686.1
See application file for complete search history.

(56) References Cited

U.S. PATENT DOCUMENTS

| | | | |
|---|---|---|---|
| 3,568,197 | A | 3/1971 | Cubley |
| 3,663,932 | A | 5/1972 | Mount et al. |
| 3,688,250 | A | 8/1972 | Howlett |
| 3,693,059 | A | 9/1972 | Harris |
| 3,696,429 | A | 10/1972 | Tressa |
| 3,876,946 | A | 4/1975 | La Clair et al. |
| 3,984,835 | A | 10/1976 | Kaplan et al. |
| 4,243,955 | A | 1/1981 | Daniel et al. |
| 4,297,672 | A | 10/1981 | Fruchey et al. |
| 4,325,057 | A | 4/1982 | Bishop |
| 4,509,123 | A | 4/1985 | Vereen |

(Continued)

FOREIGN PATENT DOCUMENTS

| | | |
|---|---|---|
| CA | 2218269 | 4/1999 |
| DE | 10 2005 062 8 | 6/2007 |

(Continued)

OTHER PUBLICATIONS

International Search Report for International Publication No. PCT/US2013/029032, dated May 8, 2013.

(Continued)

*Primary Examiner* — Igor Borissov

(74) *Attorney, Agent, or Firm* — Procopio; Mark W Catanese; Noel C Gillespie

(57) ABSTRACT

An RFID tag and a method of its use are disclosed. One such RFID tag includes first, second, and third RFID inlays included on a tag housing, the first, second, and third RFID inlays each corresponding to a different rate identifier. The tag also includes a panel engaged with the housing and movable among first, second and third positions. The panel includes RFID shorting structures each positioned to electrically contact one of the first, second, and third RFID inlays such that, in any of the first, second, and third positions, only one of the first, second, and third RFID inlays remains active.

9 Claims, 12 Drawing Sheets

(56) References Cited

U.S. PATENT DOCUMENTS

| | | | |
|---|---|---|---|
| 4,595,915 A | 6/1986 | Close | |
| 4,849,706 A | 7/1989 | Davis et al. | |
| 4,857,925 A | 8/1989 | Brubaker | |
| 4,870,391 A | 9/1989 | Cooper | |
| 4,873,529 A | 10/1989 | Gibson | |
| 4,903,033 A | 2/1990 | Tsao et al. | |
| 4,968,967 A | 11/1990 | Stove | |
| 5,012,225 A | 4/1991 | Gill | |
| 5,021,780 A | 6/1991 | Fabiano et al. | |
| 5,038,283 A | 8/1991 | Caveney | |
| 5,095,536 A | 3/1992 | Loper | |
| 5,165,109 A | 11/1992 | Han et al. | |
| 5,278,563 A | 1/1994 | Spiess | |
| 5,278,569 A | 1/1994 | Ohta et al. | |
| 5,293,408 A | 3/1994 | Takahashi et al. | |
| 5,334,822 A | 8/1994 | Sanford | |
| 5,381,157 A | 1/1995 | Shiga | |
| 5,396,489 A | 3/1995 | Harrison | |
| 5,430,441 A | 7/1995 | Bickley et al. | |
| 5,444,864 A | 8/1995 | Smith | |
| 5,461,374 A | 10/1995 | Lewiner et al. | |
| 5,477,215 A | 12/1995 | Mandelbaum | |
| 5,495,500 A | 2/1996 | Jovanovich et al. | |
| 5,506,584 A | 4/1996 | Boles | |
| 5,519,729 A | 5/1996 | Jurisch et al. | |
| 5,539,394 A | 7/1996 | Cato et al. | |
| 5,608,379 A | 3/1997 | Narlow et al. | |
| 5,613,216 A | 3/1997 | Galler | |
| 5,630,072 A | 5/1997 | Dobbins | |
| 5,648,767 A | 7/1997 | O'Connor et al. | |
| 5,649,295 A | 7/1997 | Shober et al. | |
| 5,661,485 A | 8/1997 | Manuel | |
| 5,661,494 A | 8/1997 | Bondyopadhyay | |
| 5,668,558 A | 9/1997 | Hong | |
| 5,708,423 A | 1/1998 | Ghaffari et al. | |
| 5,729,576 A | 3/1998 | Stone et al. | |
| 5,745,037 A | 4/1998 | Guthrie et al. | |
| 5,777,561 A | 7/1998 | Chieu et al. | |
| 5,784,414 A | 7/1998 | Bruckers et al. | |
| 5,825,753 A | 10/1998 | Betts et al. | |
| 5,831,578 A | 11/1998 | Lefevre | |
| 5,841,814 A | 11/1998 | Cupo | |
| 5,850,187 A | 12/1998 | Carrender et al. | |
| 5,861,848 A | 1/1999 | Iwasaki | |
| 5,892,396 A | 4/1999 | Anderson et al. | |
| 5,898,405 A | 4/1999 | Iwasaki | |
| 5,905,405 A | 5/1999 | Ishizawa | |
| 5,940,006 A | 8/1999 | MacLellan et al. | |
| 5,974,301 A | 10/1999 | Palmer et al. | |
| 6,025,780 A | 2/2000 | Bowers et al. | |
| 6,026,378 A | 2/2000 | Onozaki | |
| 6,084,530 A | 7/2000 | Pidwerbetsky et al. | |
| 6,094,149 A | 7/2000 | Wilson | |
| 6,107,910 A | 8/2000 | Nysen | |
| 6,121,544 A * | 9/2000 | Petsinger | G06K 19/005 150/147 |
| 6,121,929 A | 9/2000 | Olson et al. | |
| 6,137,447 A | 10/2000 | Saitoh et al. | |
| 6,176,425 B1 * | 1/2001 | Harrison et al. | 235/385 |
| 6,177,861 B1 | 1/2001 | MacLellan et al. | |
| 6,192,225 B1 | 2/2001 | Arpaia et al. | |
| 6,219,534 B1 | 4/2001 | Torii | |
| 6,229,817 B1 | 5/2001 | Fischer et al. | |
| 6,229,987 B1 | 5/2001 | Greeff et al. | |
| 6,232,837 B1 | 5/2001 | Yoo et al. | |
| 6,275,192 B1 | 8/2001 | Kim | |
| 6,317,027 B1 | 11/2001 | Watkins | |
| 6,320,542 B1 | 11/2001 | Yamamoto et al. | |
| 6,366,216 B1 | 4/2002 | Olesen | |
| 6,412,086 B1 | 6/2002 | Friedman et al. | |
| 6,414,626 B1 | 7/2002 | Greef et al. | |
| 6,442,276 B1 | 8/2002 | Doljack | |
| 6,456,668 B1 | 9/2002 | MacLellan et al. | |
| 6,459,687 B1 | 10/2002 | Bourlas et al. | |
| 6,466,130 B2 | 10/2002 | Van Horn et al. | |
| 6,492,933 B1 | 12/2002 | McEwan | |
| 6,501,807 B1 | 12/2002 | Chieu et al. | |
| 6,531,957 B1 | 3/2003 | Nysen | |
| 6,538,564 B1 | 3/2003 | Cole | |
| 6,566,997 B1 | 5/2003 | Bradin | |
| 6,567,648 B1 | 5/2003 | Ahn et al. | |
| 6,603,391 B1 | 8/2003 | Greeff et al. | |
| 6,639,509 B1 | 10/2003 | Martinez | |
| 6,700,547 B2 | 3/2004 | Mejia et al. | |
| 6,714,121 B1 | 3/2004 | Moore | |
| 6,714,133 B2 | 3/2004 | Hum et al. | |
| 6,768,441 B2 | 7/2004 | Singvall et al. | |
| 6,774,685 B2 | 8/2004 | O'Toole et al. | |
| 6,784,789 B2 | 8/2004 | Eroglu et al. | |
| 6,794,000 B2 | 9/2004 | Adams et al. | |
| 6,798,384 B2 | 9/2004 | Aikawa et al. | |
| 6,816,125 B2 | 11/2004 | Kuhns et al. | |
| 6,819,938 B2 | 11/2004 | Sahota | |
| 6,831,603 B2 | 12/2004 | Menache | |
| 6,838,989 B1 | 1/2005 | Mays et al. | |
| 6,888,509 B2 | 5/2005 | Atherton | |
| 6,974,928 B2 | 12/2005 | Bloom | |
| 7,009,496 B2 | 3/2006 | Arneson et al. | |
| 7,034,689 B2 | 4/2006 | Teplixky et al. | |
| 7,039,359 B2 | 5/2006 | Martinez | |
| 7,043,269 B2 | 5/2006 | Ono et al. | |
| 7,053,755 B2 | 5/2006 | Atkins et al. | |
| 7,058,368 B2 | 6/2006 | Nicholls et al. | |
| 7,083,083 B2 | 8/2006 | Droz | |
| 7,084,769 B2 | 8/2006 | Bauer et al. | |
| 7,088,248 B2 | 8/2006 | Forster | |
| 7,091,828 B2 | 8/2006 | Greeff et al. | |
| 7,095,324 B2 | 8/2006 | Conwell et al. | |
| 7,095,985 B1 | 8/2006 | Hofmann | |
| 7,099,406 B2 | 8/2006 | Najarian et al. | |
| 7,099,671 B2 | 8/2006 | Liang | |
| 7,100,835 B2 * | 9/2006 | Selker | 235/492 |
| 7,109,867 B2 | 9/2006 | Forster | |
| 7,155,172 B2 | 12/2006 | Scott | |
| 7,180,402 B2 | 2/2007 | Carrender et al. | |
| 7,197,279 B2 | 3/2007 | Bellantoni | |
| 7,199,713 B2 | 4/2007 | Barink et al. | |
| 7,215,976 B2 | 5/2007 | Brideglall | |
| 7,221,900 B2 | 5/2007 | Reade et al. | |
| 7,256,682 B2 | 8/2007 | Sweeney, II | |
| 7,257,079 B1 | 8/2007 | Bachrach | |
| 7,284,703 B2 | 10/2007 | Powell et al. | |
| 7,357,299 B2 | 4/2008 | Frerking | |
| 7,375,634 B2 | 5/2008 | Sprague | |
| 7,385,511 B2 | 6/2008 | Muchkaev | |
| 7,388,468 B2 | 6/2008 | Diorio et al. | |
| 7,388,501 B2 | 6/2008 | Tang et al. | |
| 7,409,194 B2 | 8/2008 | Shi et al. | |
| 7,411,505 B2 | 8/2008 | Smith et al. | |
| 7,413,124 B2 | 8/2008 | Frank et al. | |
| 7,429,953 B2 | 9/2008 | Buris et al. | |
| 7,432,817 B2 | 10/2008 | Phipps et al. | |
| 7,432,874 B2 | 10/2008 | Meissner | |
| 7,440,743 B2 | 10/2008 | Hara et al. | |
| 7,450,919 B1 | 11/2008 | Chen et al. | |
| 7,460,014 B2 | 12/2008 | Pettus | |
| 7,477,887 B2 | 1/2009 | Youn | |
| 7,479,874 B2 | 1/2009 | Kim et al. | |
| 7,492,812 B2 | 2/2009 | Ninomiya et al. | |
| 7,526,266 B2 | 4/2009 | Al-Mandawi | |
| 7,548,153 B2 | 6/2009 | Gravelle et al. | |
| 7,551,085 B2 | 6/2009 | Pempsell et al. | |
| 7,557,762 B2 | 7/2009 | Shimaski et al. | |
| 7,561,866 B2 | 7/2009 | Oliver et al. | |
| 7,562,083 B2 | 7/2009 | Smith et al. | |
| 7,570,164 B2 | 8/2009 | Chakraborty et al. | |
| 7,576,657 B2 | 8/2009 | Duron et al. | |
| 7,580,378 B2 | 8/2009 | Carrender et al. | |
| 7,583,179 B2 | 9/2009 | Wu et al. | |
| 7,586,416 B2 | 9/2009 | Ariyoshi et al. | |
| 7,592,898 B1 | 9/2009 | Ovard et al. | |
| 7,592,915 B2 | 9/2009 | Liu | |
| 7,594,153 B2 | 9/2009 | Kim et al. | |
| 7,595,729 B2 | 9/2009 | Ku et al. | |

(56) References Cited

U.S. PATENT DOCUMENTS

| | | |
|---|---|---|
| 7,596,189 B2 | 9/2009 | Yu et al. |
| 7,606,532 B2 | 10/2009 | Wuidart |
| 7,609,163 B2 | 10/2009 | Shafer |
| 7,612,675 B2 | 11/2009 | Miller et al. |
| 7,782,206 B2 | 8/2010 | Burnett et al. |
| 7,994,924 B2* | 8/2011 | Brandt et al. ............. 340/572.7 |
| 7,999,682 B2 | 8/2011 | Burnett et al. |
| 8,018,344 B2 | 9/2011 | Chang et al. |
| 2001/0048715 A1 | 12/2001 | Lee et al. |
| 2002/0021208 A1 | 2/2002 | Nicholson et al. |
| 2002/0067264 A1 | 6/2002 | Soehnlen |
| 2002/0072344 A1 | 6/2002 | Souissi |
| 2002/0119748 A1 | 8/2002 | Prax et al. |
| 2002/0141347 A1 | 10/2002 | Harp et al. |
| 2003/0021367 A1 | 1/2003 | Smith |
| 2003/0052161 A1 | 3/2003 | Rakers et al. |
| 2003/0107877 A1* | 6/2003 | Mennecart ............ A45C 11/182 361/752 |
| 2003/0116634 A1* | 6/2003 | Tanaka ......................... 235/492 |
| 2003/0228860 A1 | 12/2003 | Jou |
| 2005/0084003 A1 | 4/2005 | Duron et al. |
| 2005/0099270 A1 | 5/2005 | Diorio et al. |
| 2005/0099340 A1 | 5/2005 | Suzuki |
| 2005/0107051 A1 | 5/2005 | Aparin et al. |
| 2005/0114326 A1 | 5/2005 | Smith et al. |
| 2005/0116867 A1 | 6/2005 | Park et al. |
| 2005/0156031 A1 | 7/2005 | Goel et al. |
| 2005/0179520 A1 | 8/2005 | Ziebertz |
| 2005/0236489 A1 | 10/2005 | Droz |
| 2005/0237843 A1 | 10/2005 | Hyde |
| 2005/0259768 A1 | 11/2005 | Yang et al. |
| 2006/0022800 A1 | 2/2006 | Krishna et al. |
| 2006/0086809 A1 | 4/2006 | Shanks et al. |
| 2006/0098765 A1 | 5/2006 | Thomas et al. |
| 2006/0103533 A1 | 5/2006 | Pahlavan et al. |
| 2006/0125603 A1 | 6/2006 | Nahear |
| 2006/0132313 A1 | 6/2006 | Moskowitz |
| 2006/0183454 A1 | 8/2006 | Al-Mandawi |
| 2006/0214773 A1 | 9/2006 | Wagner et al. |
| 2006/0238302 A1 | 10/2006 | Loving et al. |
| 2006/0252398 A1 | 11/2006 | Park et al. |
| 2006/0267734 A1 | 11/2006 | Taki et al. |
| 2006/0290502 A1 | 12/2006 | Rawlings |
| 2007/0001809 A1 | 1/2007 | Kodukula et al. |
| 2007/0001813 A1 | 1/2007 | Maguire et al. |
| 2007/0008129 A1* | 1/2007 | Soliman ..................... 340/572.1 |
| 2007/0018792 A1 | 1/2007 | Taki et al. |
| 2007/0046432 A1 | 3/2007 | Aiouaz et al. |
| 2007/0060075 A1 | 3/2007 | Mikuteit |
| 2007/0069858 A1* | 3/2007 | Kubo ........................... 340/10.1 |
| 2007/0082617 A1 | 4/2007 | McCallister |
| 2007/0109101 A1 | 5/2007 | Colby |
| 2007/0126556 A1* | 6/2007 | Subramanian et al. ..... 340/10.4 |
| 2007/0133392 A1 | 6/2007 | Shin et al. |
| 2007/0139200 A1 | 6/2007 | Yushkov et al. |
| 2007/0152829 A1 | 7/2007 | Lindsay et al. |
| 2007/0164868 A1 | 7/2007 | Deavours et al. |
| 2007/0188305 A1 | 8/2007 | Drucker |
| 2007/0205953 A1 | 9/2007 | Bombay et al. |
| 2007/0206704 A1 | 9/2007 | Zhou et al. |
| 2007/0206705 A1 | 9/2007 | Stewart |
| 2007/0222604 A1 | 9/2007 | Phipps et al. |
| 2007/0222606 A1 | 9/2007 | Phipps et al. |
| 2007/0236335 A1 | 10/2007 | Aiouaz et al. |
| 2007/0285238 A1 | 12/2007 | Batra |
| 2007/0290846 A1 | 12/2007 | Schilling et al. |
| 2007/0290858 A1 | 12/2007 | Janke et al. |
| 2008/0012688 A1 | 1/2008 | Ha et al. |
| 2008/0018431 A1 | 1/2008 | Turner et al. |
| 2008/0048867 A1 | 2/2008 | Oliver et al. |
| 2008/0049870 A1 | 2/2008 | Shoarinejad et al. |
| 2008/0065957 A1 | 3/2008 | Shoarinejad et al. |
| 2008/0068173 A1 | 3/2008 | Alexis et al. |
| 2008/0084310 A1 | 4/2008 | Nikitin et al. |
| 2008/0136595 A1 | 6/2008 | Finkenzeller |
| 2008/0143486 A1 | 6/2008 | Downie et al. |
| 2008/0191961 A1 | 8/2008 | Tuttle |
| 2008/0258916 A1 | 10/2008 | Diorio et al. |
| 2008/0278286 A1 | 11/2008 | Takaluoma et al. |
| 2009/0022067 A1 | 1/2009 | Gotwals |
| 2009/0053996 A1 | 2/2009 | Enguent et al. |
| 2009/0091454 A1 | 4/2009 | Tuttle |
| 2009/0096612 A1 | 4/2009 | Seppa et al. |
| 2009/0101720 A1 | 4/2009 | Dewan et al. |
| 2009/0303013 A1* | 12/2009 | Edgerton ..................... 340/10.1 |
| 2010/0194542 A1* | 8/2010 | Noakes ............ G06K 19/07327 340/10.1 |
| 2010/0225482 A1* | 9/2010 | Kasai ................. G06K 19/0717 340/572.1 |
| 2010/0302012 A1 | 12/2010 | Roesner |

FOREIGN PATENT DOCUMENTS

| | | |
|---|---|---|
| EP | 0 133 317 B1 | 9/1988 |
| EP | 0 156 440 B1 | 1/1990 |
| EP | 0 498 369 A2 | 8/1992 |
| EP | 0 915 573 A2 | 5/1999 |
| EP | 0 923 061 A1 | 6/1999 |
| EP | 1 095 427 B1 | 7/2003 |
| EP | 1 436 857 B1 | 1/2008 |
| EP | 2 178 023 A2 | 4/2010 |
| FR | 2 648 602 A1 | 12/1990 |
| GB | 1 270 456 | 4/1972 |
| JP | 1-158836 | 6/1989 |
| JP | 2002-185381 | 6/2002 |
| JP | 2005-227818 | 8/2005 |
| JP | 2005-253058 | 9/2005 |
| JP | 2006-252367 | 9/2006 |
| KR | 2002-0091572 | 12/2002 |
| WO | WO 90/16119 | 12/1990 |
| WO | WO 99/05659 | 2/1999 |
| WO | WO 01/24407 A1 | 4/2001 |
| WO | WO 03/044892 A1 | 5/2003 |
| WO | WO 2004/001445 A1 | 12/2003 |
| WO | WO 2005/072137 A2 | 8/2005 |
| WO | WO 2006/037241 A1 | 4/2006 |
| WO | WO 2006/068635 A1 | 6/2006 |
| WO | WO 2007/003300 A1 | 1/2007 |
| WO | WO 2007/094787 A1 | 8/2007 |
| WO | WO 2007/126240 A1 | 11/2007 |
| WO | WO 2009/058809 A2 | 5/2009 |
| WO | WO 2012/019768 | 2/2012 |

OTHER PUBLICATIONS

"Developments in Printed Conductors and Tags," IDTechEx, retrieved from http:///www.idtechex.com/research/articles/developments_in_printed_conductors_and_tags_00000188.asp, 1 page (Jun. 6, 2005).

"Near Field UHF Versus HF," IDTechEx, retrieved from http://www.idtechex.com/research/articles/near_field_uhf_versus_hf_00000474.asp, 3 pages (May 16, 2006).

"New Alien Software Can Identify Velocity, Position of Tags," RFID News, retrieved from http://www.rfidnews.org/2008/04/14/new-alien-software-can-identify-velocity-position-of-tags, 2 pages (Apr. 14, 2008).

"Radio Frequency Identification (RFID Primer)," retrieved from http://ocw.mit.edu/NR/rdonlyres/Sloan-School-of-Management/15-762JSpring-2005/23F46055-7F21-4046-B2C3-7E96680790DD/0/rfid_primer.pdf, 23 pages (2005).

Binu, P. et al., "A New Microstrip Patch Antenna for Mobile Communications and Bluetooth Applications," Microwave and Optical Technology Letters, vol. 33, No. 4, pp. 285-286 (May 20, 2002).

Bridgelall, R., "Bluetooth/802.11 Protocol Adaptation for RFIT Tags," paper presented at the 2002 European Wireless Conference, retrieved from http://www2.ing.unipi.it/ew2002/proceedings/001.pdf, 4 pages (2002).

Burgener, E.C., "A Personal Transit Arrival Time Receiver," IEEE—IEE Vehicle Navigation & Information Systems Confer-

(56) References Cited

OTHER PUBLICATIONS ence, Ottawa, Ontario, Canada, retrieved from http://ieeexplore.ieee.org/xpl/freeabs_all.jsp?arnumber=585583, pp. 54-55 (1993).
Cavoukian, A., "Adding an On/Off Device to Activate the RFID in Enhanced Driver's Licenses: Pioneering a Made-in-Ontario Transformative Technology that Delivers Both Privacy and Security," Information and Privacy Commissioner of Ontario, Ontario, Canada, retrieved from http://www.ipc.on.ca/images/Resources.edl.pdf, pp. 1-3 (Mar. 2009).
Desmons, D., "UHF Gen 2 for Item-level Tagging," Impinj, INc., retrieved from http://www.impinj.com/files/Impinj_ILT_RFID_World.pdf, pp. 1-24 (Feb. 27-Mar. 1, 2006).
Donovan, J., "Software-Defined Radio Tackles Wireless Compatibility Issues," Portable Design, retrieved from http://www.qmags.com/download/default.aspx?pub=PD&upid=11675&fl=others/PD/PD_20060401_Apr_2006.pdf, pp. 8-12 (Apr. 2006).
Garg et al., "Microstrip Radiators," Microstrip Antenna Design Handbook, Artech House, Inc., Norwood, MA, pp. 1-72 (2001).
Han, Y. et al., "System Modeling and Simulation of RFID," Auto-ID Labs at Fudan University, Shanghai, P.R. China, retrieved from http://citeseerx.ist.psu.edu/viewdoc/download?doi=10.1.1.116.7275&rep=rep1&type=pdf, 12 pages.
Hansen, T. et al., "Method for Controlling the Angular Extent of Interrogation Zones in RFID," IEEE Antennas and Wireless Propagation Letters, vol. 5, pp. 134-137 (2006).
Hiltunen, K., "Using RF Repeaters to Improve WCDMA HSDPA Coverage and Capacity Inside Buildings," The 17th Annual IEEE International Symposium on Personal, Indoor, and Mobile Radio Communications (PIMRC-06), retrieved from http://www.ericsson.com/technology/research_papers/wireless_access/doc/PIMRC06_hiltunen.pdf, 5 pages (2006).
International Preliminary Report on Patentability issued in International Application No. PCT/US2010/036878, dated Aug. 29, 2011, 9 pages.
International Search Report and Written Opinion issued in International Application No. PCT/US2010/036878, dated Aug. 31, 2010, 15 pages.
Jiming, Q. et al., "Development of a 3cm Band Reflected Power Canceller," Radar, 2001 CIE Internatinoal Conference on, Proceedings, pp. 1098-1102 (2001).
Khandelwal, G. et al., "Intelligent MAC Design for RFID Networks," The Pennsylvania State University, 1 page.
Khandelwal, G. et al., "OPT: Optimal Protocol Tree for Efficient Tag Identification in Dense RFID Systems," IEEE International Conference on Communications, pp. 128-133 (Jun. 2006).
Kusy et al., "Tracking Mobile Nodes Using RF Doppler Shifts," Vanderbilt University, Nashville, Tennessee, retrieved from http://www.isis.vanderbilt.edu/sites/default/files/Kusy_B_11_7_2007_Tracking_M.pdf, 14 pages.
O'Connor, Mary Catherine, "Wal-Mart Seeks UHF for Item-Level," RFID Journal, Inc., retrieved from http:/www.rfidjournal.com/article/articleview/2228/1/1/, pp. 1-3 (Mar. 30, 2006).
Rohatgi, A. et al., "Implementation of an Anti-Collision Differential-Offset Spread Spectrum RFID System," IEEE Antennas and Propagation Society International Symposium 2006, vol. 1, retrieved from http://www.propagation.gatech.edu/Archive/PG_CP_060710_AR/PG_CP_060710_AR.prd, 6 pages (2006).
Ryu, H-K. et al., "Size Reduction in UHF Band RFID Tag Antenna Based on Circular Loop Antenna," 18th International Conference on Applied Electromagnetics and Communications, ICECom, pp. 1-4 (Oct. 12-14, 2005).
Waldrop, J. et al., "Colorwave: A MAC for RFID Reader Networks," IEEE Wireless Communications and Networking, vol. 3, pp. 1701-1704 (2003).
Yu, P. et al., "Securing RFID with Ultra-wideband Modulation,"2nd Workshop on RFID Security (RFIDSec 2006), Graz, Austria, retrieved from http://events.iaik.tugraz.at/RFIDSec06/Program/papers/004%20-%20Ultra%20Wideband%20Modulation.pdf, 12 pages (Jul. 2006).

* cited by examiner

SWITCHABLE RFID TAG

BACKGROUND

RFID tags are used in a multitude of situations and may need to operate in two or more distinct conditions or states. A basic example of when an RFID tag is configured to alternate between two different states is when an RFID tag can be activated and deactivated. For example, RFID tags may be deactivated by disrupting the radio frequency (RF) field of the tag.

U.S. patent application Ser. No. 12/477,064, listing a common inventor and assignee to the present application, describes a number of designs for creating a two-state RFID tag. In that disclosure, an RFID tag is deactivated, not by blocking the field or by use of a mechanical switch (two common arrangements), but rather by capacitively shorting sections of the RFID tag, such that the tag would not absorb RF energy.

A further example of such an on/off, two state tag is illustrated in FIGS. 2A-2B. As shown the tag 200 includes a housing 202 and a slidable panel 204. An RFID inlay 206 is printed on a surface of the housing, and an RFID shorting structure 208 is disposed on the slidable panel.

In FIG. 2A, the panel 204 is positioned in a first position, such that the RFID shorting structure 208 and the RFID inlay 206 are aligned. This causes a capacitive electrical connection between the RFID shorting structure and the inlay. As such, sections of the inlay 206, in particular antenna sections, are shorted such that that the inlay's antenna would not absorb RF energy. In FIG. 2B, the panel 204 is moved to a second position, such that the RFID shorting structure 208 is moved out of alignment with the RFID inlay. This therefore allows the RFID inlay 206 to absorb RF energy, and accordingly respond to received RFID read requests.

Although the '064 application, and the above-described design of FIGS. 2A-2B, describe tags that have a number of advantages over other solutions for creating a switching tag, these tags nevertheless do have disadvantages. For example, that application does not disclose any type of arrangement that may provide for more than two states in a tag, or providing for two states in a tag that are recognizable at a reader due to received responses. This is because, in the deactivated state, the tag is essentially transparent to an RFID reader.

SUMMARY

The present disclosure is directed to switchable RFID tags. In a first example aspect, an RFID tag includes first, second, and third RFID inlays included on a tag housing. Each of the first, second, and third RFID inlays corresponds to a different rate identifier. The RFID tag also includes a panel engaged with the housing and movable among first, second and third positions relative to the first, second, and third RFID inlays. The panel includes a plurality of RFID shorting structures each positioned to electrically contact one of the first, second, and third RFID inlays such that, in any of the first, second, and third positions, only one of the first, second, and third RFID inlays remains disconnected from any of the plurality of RFID shorting structures.

In a second aspect, an RFID tag is disclosed that includes a first RFID inlay disposed on a first surface, and a second RFID inlay disposed on a second surface spaced apart from the first surface, with the first and second RFID inlays positioned in alignment with each other. The RFID tag also includes a panel movable between first and second positions relative to the first and second surfaces. The panel includes a first RFID shorting structure and a second RFID shorting structure offset from the first RFID structure. When the panel is in the first position, the first RFID shorting structure is offset from the first RFID inlay and the second RFID shorting structure is aligned with the second RFID inlay, and in the second position, the second RFID shorting structure is offset from the second RFID inlay and the first RFID shorting structure is aligned with the first RFID inlay.

In a third aspect, an RFID tag includes a first RFID inlay, a second RFID inlay spaced apart from first RFID inlay, and a third RFID inlay and spaced apart from the first and second RFID inlays. The RFID tag also includes a panel movable among first, second, and third positions relative to the first, second, and third RFID inlays. The panel includes a first RFID shorting structure positioned such that, when the panel is in the first position, the first RFID shorting structure is aligned with the second RFID inlay and when the panel is in the second position, the first RFID shorting structure is aligned with the first RFID inlay. The panel also includes a second RFID shorting structure offset from the first RFID shorting structure such that, when the panel is in the first position, the second RFID shorting structure is aligned with the third RFID inlay, when the panel is in the second position, the second RFID shorting structure is aligned with the second RFID inlay, and when the panel is in the third position, the second RFID shorting structure is aligned with the first RFID inlay. The panel further includes a third RFID shorting structure offset from the first and second RFID shorting structures such that, when the panel is in the third position, the third RFID shorting structure is aligned with the third RFID inlay.

In a fourth aspect, a method of using an RFID tag is disclosed. The method includes associating the RFID tag with a user account. The RFID tag includes first, second, and third RFID inlays corresponding to first, second, and third rate structures, wherein the RFID tag includes a panel movable among first, second and third positions relative to the first, second, and third RFID inlays. The panel includes a plurality of RFID shorting structures each positioned to electrically contact one of the first, second, and third RFID inlays such that, in any of the first, second, and third positions, only one of the first, second, and third RFID inlays remains disconnected from any of the plurality of RFID shorting structures. The method further includes receiving a tag reading indicating that a first RFID inlay of the RFID tag is active, and charging the user account according to a first rate structure.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
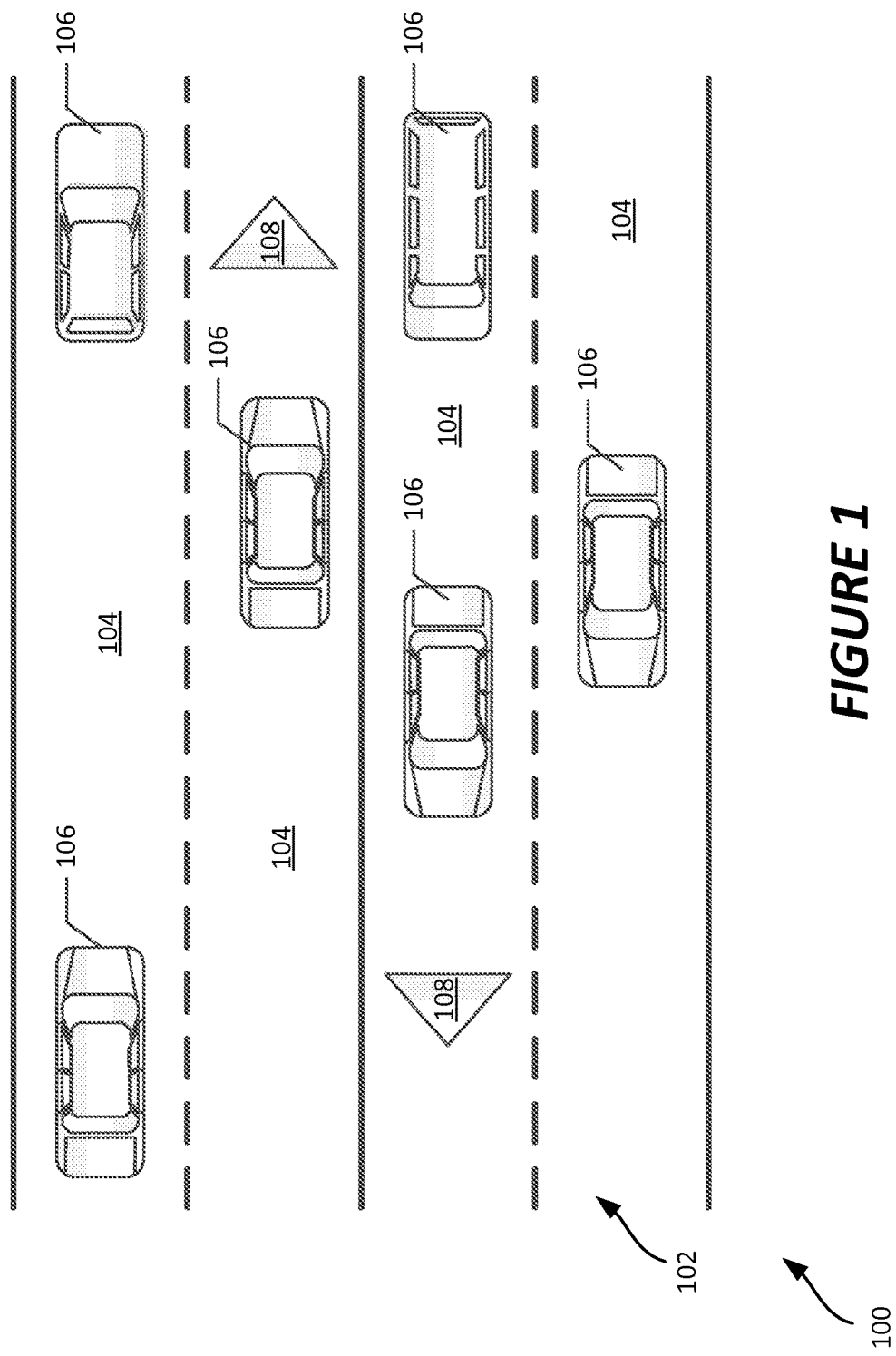
FIG. 1 illustrates an example environment in which the switchable RFID tag of the present disclosure can be used.

Various embodiments of the present disclosure will be described in detail with reference to the drawings, wherein like reference numerals represent like parts and assemblies throughout the several views. Reference to various embodiments does not limit the scope of the disclosure. Additionally, any examples set forth in this specification are not intended to be limiting and merely set forth some of the many possible embodiments for the present disclosure.

In general, the present disclosure relates to arrangements for a switchable RFID tag, including a stacked switchable RFID tag, that has a plurality of states in which the RFID tag is capable of response to an RFID reader. The RFID tags according to the present disclosure generally correspond to compact designs which allow for use of two or more active RFID inlays, such that an RFID tag can respond in a number of different ways to a single interrogation signal from an RFID reader.

Referring now to FIG. 1, an example environment in which a switchable RFID tag of the present disclosure can be used. In particular, the environment 100 illustrates a traffic application, in which an RFID tag can be issued to a driver or household of drivers. As shown, a roadway 102 can include a plurality of lanes 104, one or more of which may be traffic controlled. For example, the roadway can be a toll road, in which all lanes are controlled by an RFID-based tolling system, or can alternatively include one or more lanes with which charges may be associated. For instance, one or more of the lanes 104 may be a high occupancy vehicle lane in which single-occupancy vehicles may travel upon payment of a fee.

As shown, the roadway 102 has a plurality of vehicles 106 travelling thereon, and includes one or more RFID readers 108 associated with controlled traffic lanes 104. Some or all of the vehicles 104 could have installed thereon an RFID tag, such as those described below in connection with FIGS. 3-7, for communication with an RFID reader 108 based on one or more user-selectable states. In certain embodiments, the RFID reader 108 can be any of a number of RFID reader devices, such as the IDentity™ 5100 UHF Reader manufactured by Federal Signal Technologies of Irvine, Calif. Other RFID readers can be used as well.

In the context of the present disclosure, the environment 100 may involve charging a user of a vehicle 106 according to different rate schedules, depending upon the time and circumstances involved. For example, a user may be charged a different rate based on the time at which the user is on the road, or based on other information that may not be available to an RFID reader, and which may or may not change for any given user account. This can include, for example, a number of occupants of a vehicle (e.g., single occupancy, HOV2,i.e., two passengers, HOV3, i.e. 3+ passengers), a number of axles of the vehicle (if a user transports a tag among a plurality of different types of vehicles), a particular desired rate plan (e.g., monthly vs. per use), or other option.

Figure 2A:
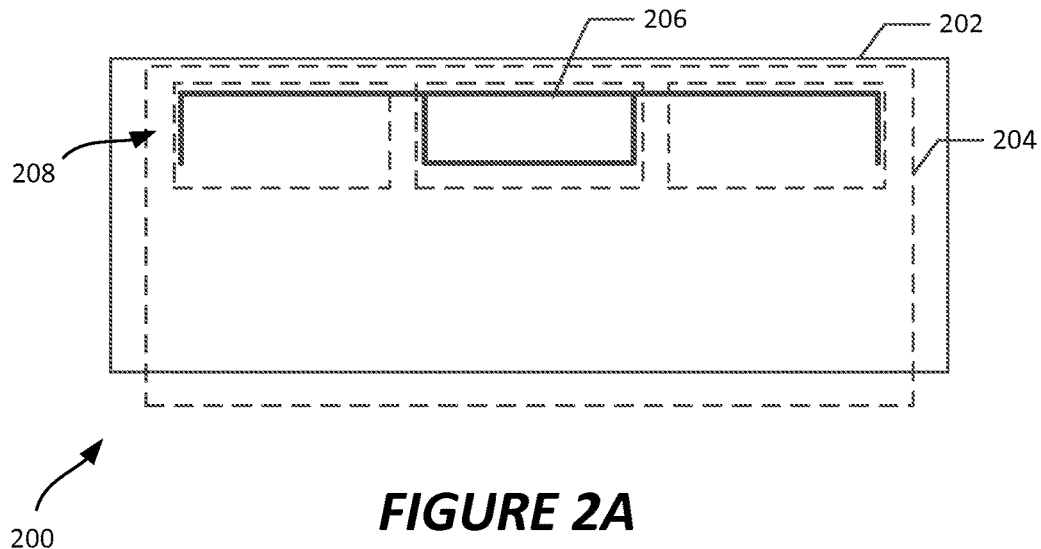
FIGS. 2A and 2B illustrate an example prior art switchable RFID tag.
Figure 2B:
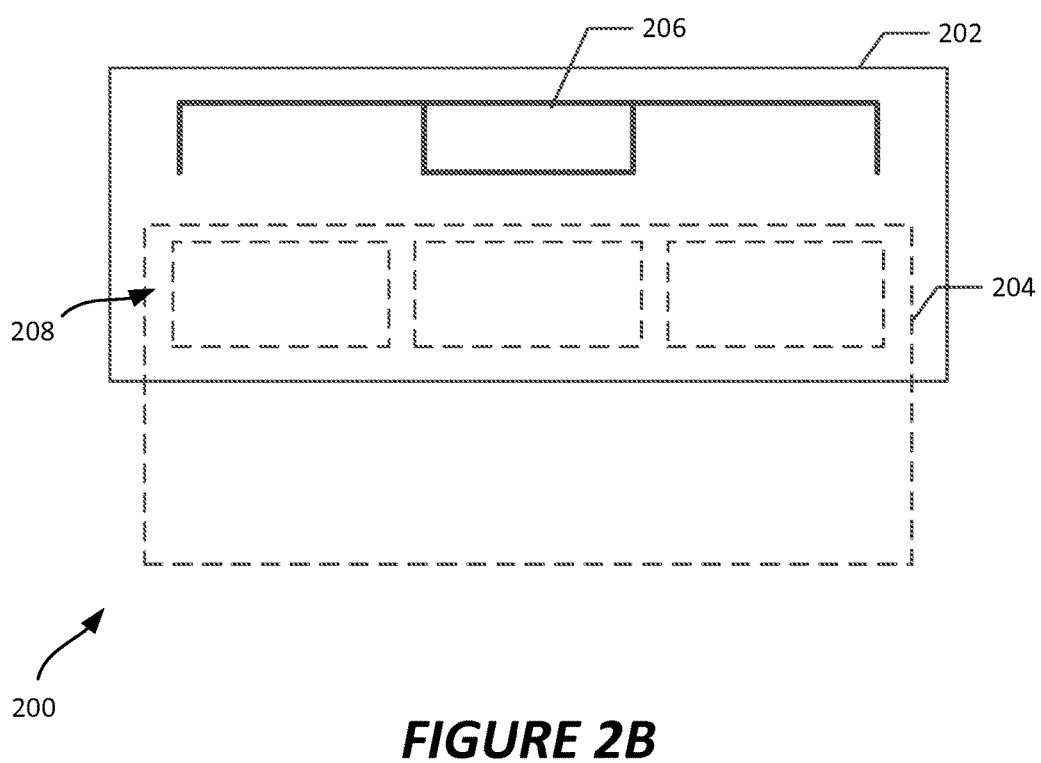

As mentioned above, the RFID tags 200 of FIGS. 2A-2B can be used in some circumstances within the environment 100, for example by vehicles which may at some times be subject to vehicle lane charges, but at other times (e.g., times of the day, or based on vehicle occupancy) may be exempt from such charges. However, if exempt from charges, the user of a vehicle 106 in the environment 100 using a tag analogous to that illustrated in FIGS. 2A-2B would set that tag to a state where the tag is not visible to a reader 108; as such, the reader would not be able to detect the presence of the vehicle 106, and the vehicle may be considered non-compliant (e.g., a nonpaying vehicle). Additionally, for the cases where the user may be able to select from among a number of rate plans or usage models, existing RFID tags provide inadequate features, since one of the two states included in such switchable RFID tags ensures that the tags do not respond at all to interrogation by an RFID reader. As such, and as discussed in further details in connection with various embodiments of RFID tags below, a plurality of different RFID inlays can be included within a single RFID tag, and, when combined with one or more shorting structures placed on another structure movable relative to the RFID inlays, the RFID tag can be configurable among a plurality of response modes. This construction therefore allows for selection from among a plurality of affirmative responses to RFID reader interrogation, as desired by the user.

Figure 3:
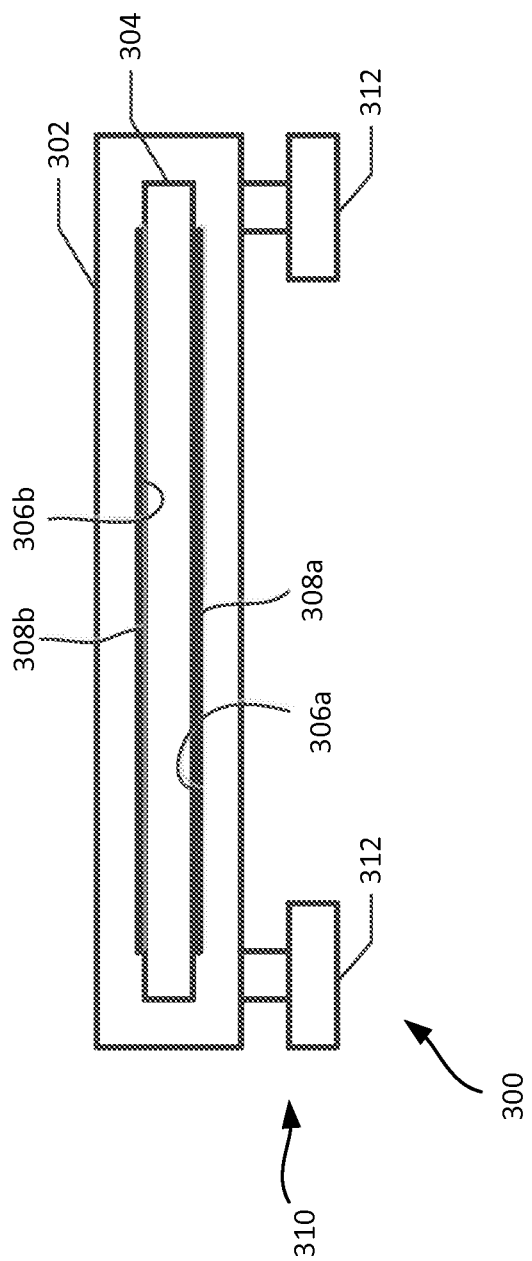
FIG. 3 depicts a schematic elevation view of a switchable RFID tag according to an example embodiment of the present disclosure.

Referring now to FIG. 3, an example structure of an RFID tag 300 is shown in which various designs of a switchable RFID tag can be implemented, according to various embodiments. The RFID tag 300 as shown includes an RFID housing 302 and a panel 304 slidable relative to the RFID housing. The RFID housing generally includes a slot within which the panel 304 is movable among a plurality of positions, each of which corresponds to a differently configured RFID tag response (e.g., by activating a different RFID inlay of the tag). Example configurations and positions of the panel 304 relative to the RFID housing 302 are illustrated in further detail in connection with the embodiments of FIGS. 4-5, below.

In the embodiment shown, the RFID housing 302 has at least first and second inner surfaces 306a-b, facing corresponding opposite surfaces 308a-b of the panel 304, respectively. In other words, a first surface 306a of the RFID housing 302 faces a corresponding first surface 308a of the panel 304, and a second surface 306b of the RFID housing 302 faces an opposing second surface 308b of the panel 304.

In various embodiments, the panel is constructed from a plastic, generally weatherproof material, and has a thickness sufficient that electrical characteristics associated with the first surfaces 306a, 308a, are essentially separate from and have little effect on electrical characteristics associated with the second surfaces 306*b*, 308*b*. In various embodiments in which RFID circuit components are positioned on both first and second surfaces 306*a-b*, 308*a-b*, the panel 304 is at least approximately 5 millimeters in thickness, resulting in less than 10% signal degradation over a stand-alone tag; however, this minimum thickness may vary depending upon a number of factors including the material used (i.e., its dielectric constant), the acceptable loss level, and the frequency and/or magnitude of the signals to be sensed by RFID inlays on the first and second surfaces 306*a-b*.

In addition, one or more attachment mechanisms 310 may be included on the RFID housing 302, to assist a user in affixing the RFID tag 300 to a desired location. In the embodiment shown, the attachment mechanism 310 includes a plurality of suction cup structures 312, allowing a user to affix the RFID tag 300 to a windshield or other window or smooth surface of a vehicle, such as for vehicular (rate/tolling) applications. In alternative embodiments, the one or more attachment mechanisms 310 may include adhesive, or other fasteners, depending upon the desired location to which the RFID tag 300 is to be affixed.

Figure 4A:
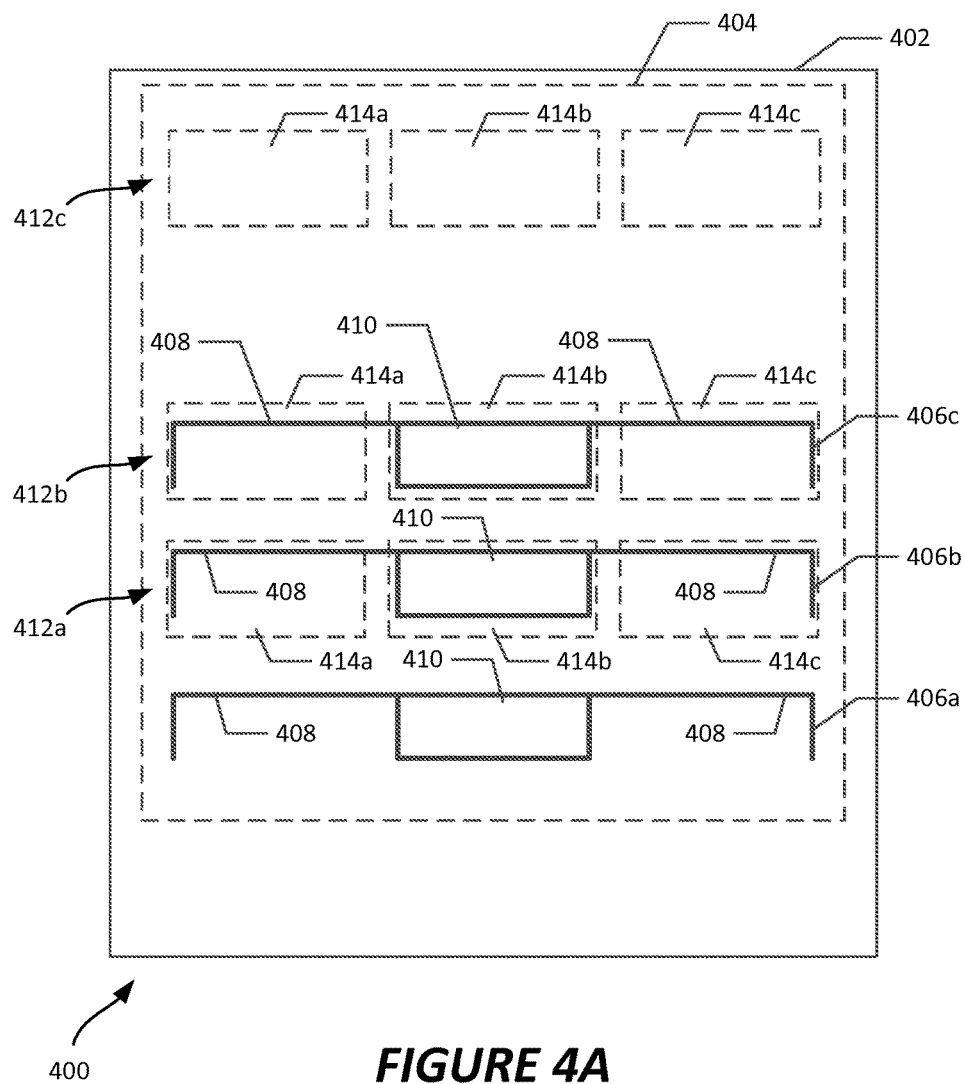
FIG. 4A depicts a schematic view of a switchable RFID tag in a first position, according to an example embodiment of the present disclosure.
Figure 4B:
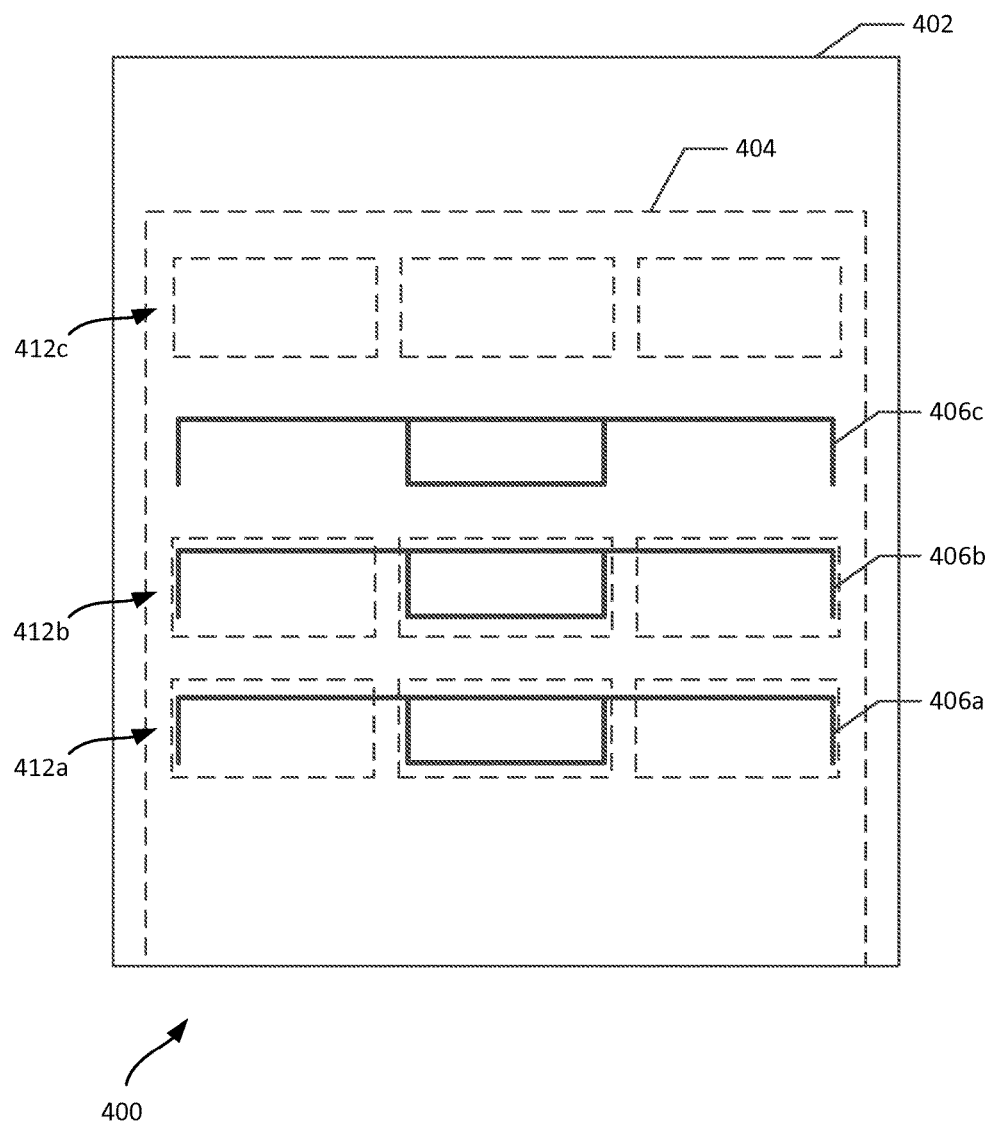
FIG. 4B depicts a schematic view of the switchable RFID tag of FIG. 4A in a second position.
Figure 4C:
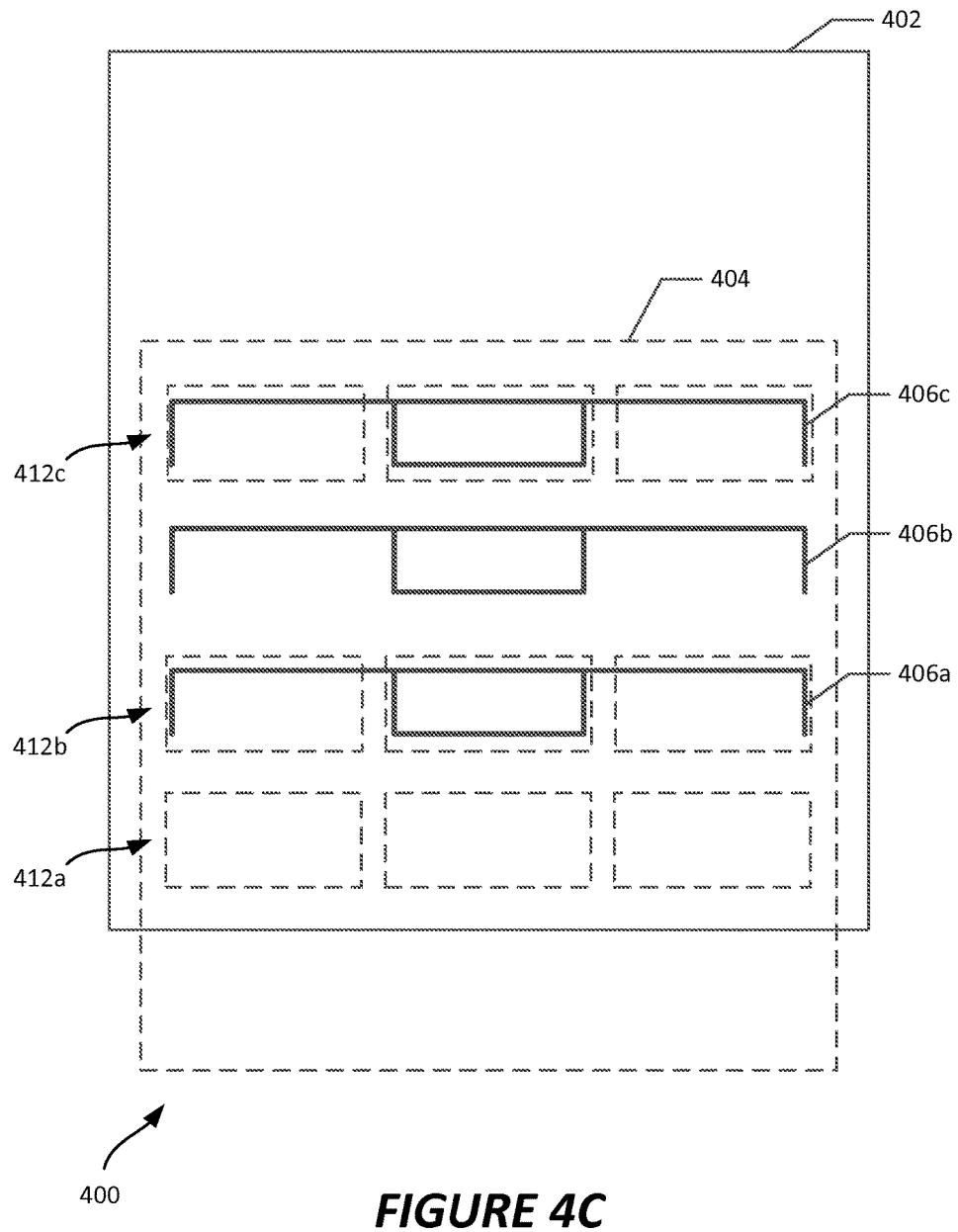
FIG. 4C depicts a schematic view of the switchable RFID tag of FIG. 4A in a third position.

Referring now to FIGS. 4A-4C, schematic views of a switchable RFID tag 400 are illustrated in a plurality of different selectable positions, according to an example embodiment. The RFID tag 400 can be constructed using the arrangement illustrated in FIG. 3, such that the tag 400 includes a housing 402 and a panel 404 movable relative to the housing 402. In the example RFID tag 400, a first surface of the housing 402, (e.g., equivalent to surface 306*a* or 306*b*) has a plurality of RFID inlays 406*a-c* (collectively referred to as RFID inlays 406) disposed thereon. Each of the RFID inlays 406*a-c* includes an antenna portion 408 and a circuit portion 410 (noted in FIG. 4A), and is responsive to signals at a predetermined frequency, tuned to respond to interrogation of an RFID reader (e.g., reader 108 of FIG. 1). In the embodiment shown, three RFID inlays 406*a-c* are disposed on the surface; however, in alternative embodiments, more or fewer RFID inlays could be included as well. Each of the RFID inlays 406*a-c* are generally disposed offset from one another at a regular spacing, such that each of the RFID inlays 406*a-c* is capable of independently receiving and responding to interrogation signals from an RFID reader independently and without substantial interference by adjacent RFID inlays.

A surface of the panel 404 that opposes the surface on which the RFID inlays 406 are disposed has a plurality of RFID shorting structures 412. The RFID shorting structures 412*a-c* (collectively referred to as RFID shorting structures 412) are sized and located to capacitively, electrically couple to portions of each of the RFID inlays when positioned in alignment with each inlay. Each of the RFID shorting structures 412 includes a plurality of grounding regions 414*a-c* that have a length that is different from the overall length of the RFID inlay 406. This allows the grounding regions 414*a-c* to not act as a tuned antenna that would otherwise alter the RF field and affect the read distance of adjacent RFID inlays 406.

The RFID shorting structures 412 are spaced apart such that first and second shorting structures 412*a-b* are positioned an analogous distance apart as the RFID inlays 412*a-c* are spaced from each other. Third RFID shorting structure 412*c* is spaced an additional distance away from the second RFID shorting structure 412*b*, such that in the second and third positions (in FIGS. 4B, 4C, respectively), an RFID inlay, such as RFID inlays 406*b* or 406*c*, can be exposed in the gap between the RFID shorting structures 412*b*, 412*c*.

Referring to FIGS. 4A-4C specifically, the panel 404 within the RFID tag 400 is movable between first, second, and third positions, in the embodiment shown. FIG. 4A illustrates an arrangement in which panel 404 is in a first position relative to the housing 402 of the RFID tag 400. In this embodiment, two RFID inlays 406*b-c* are aligned with RFID shorting structures 412*a-b*, causing those RFID inlays 406*b-c* to act like short circuits (i.e., being transparent to RFID signals). The first RFID inlay 406*a* is not aligned with any RFID shorting structure 412, such that in the event of an interrogation by an RFID reader, only RFID inlay 406*a* would receive and respond to that signal. As such, in this arrangement, RFID inlay 406*a* is active, while RFID inlays 406*b-c* are inactive, or deactivated.

FIG. 4B depicts a schematic view of the switchable RFID tag 400 where panel 404 is in a second position relative to the housing 402. In this position, the RFID inlays 406*a-b* are aligned with RFID shorting structures 412*a-b*, respectively, and RFID inlay 412*c* is exposed in the space between RFID shorting structures 412*b* and 412*c*, respectively. As such, in this arrangement, RFID inlay 406*c* is active, while RFID inlays 406*a-b* are inactive, or deactivated.

FIG. 4C depicts a schematic view of the switchable RFID tag 400 where panel 404 is in a third position relative to the housing 402. In this position, RFID inlay 406*a* is aligned with RFID shorting structure 412*b*, and RFID inlay 406*c* is aligned with RFID shorting structure 412*c*. RFID inlay 406*b* is exposed in the space between RFID shorting structures 412*b* and 412*c*, respectively. As such, in this arrangement, RFID inlay 406*b* is active, while RFID inlays 406*a-b* are inactive, or deactivated.

In accordance with the present disclosure, each of the RFID inlays 406*a-c* can have a different response to an RFID reader interrogation signal, such that each occurrence of a response from a different active inlay is distinguishable from each other. For example, a first RFID inlay 406*a* can generate and respond to an RFID interrogation with a first responsive ID signal, while second RFID inlay 406*b* can generate and respond to an RFID interrogation with a second, different responsive ID signal, and third RFID inlay 406*c* can generate and respond to an RFID interrogation with a third, different responsive ID signal. Additional inlays may have their own unique response signals. As such, based on a received RFID signal at an RFID reader, it is possible to determine by interrogating the RFID tag the current position of the panel, and therefore the claimed or elected configuration set by a user to define how to charge tolls or provide other services to a user of a vehicle or other tagged equipment/systems.

Although the embodiment illustrated in FIG. 4A-4C provides an improved arrangement in which multiple RFID responses are made possible, it is recognized that extending this arrangement to be used with three or more RFID inlays greatly increases the complexity and size of a particular RFID tag. For example, the RFID tag 400 of FIG. 4 has an overall width (or height, depending upon desired orientation), that is approximately 5 times the size of a preexisting RFID tag, and approximately 2.5 times the size of the preexisting switchable RFID tag of FIGS. 2A-2B. As such, the tag 400 may be useable in circumstances in which size is a noncritical factor but instead simplicity in construction is preferred. However, as described below in connection with FIGS. 5-7, alternative embodiments of an RFID tag exist in which this space can be substantially saved.

Referring now to FIGS. 5-7, various views of an alternative embodiment of a switchable RFID tag 500 are displayed. In particular, FIGS. 5-7 disclose an example embodiment of a stacked switchable RFID tag 500. The RFID tag 500 of FIGS. 5-7 is referred to as "stacked" in that it includes RFID inlay elements on more than a single layer of the RFID tag, thereby increasing the density of RFID inlay elements possible. For example, as illustrated in FIG. 3, described above, RFID tag 500 can be constructed using first and second layers 306*a-b* and 308*a-b* of an RFID housing 302 and panel 304 that are slidably oriented with respect to one another, in an example arrangement.

Figure 5A:
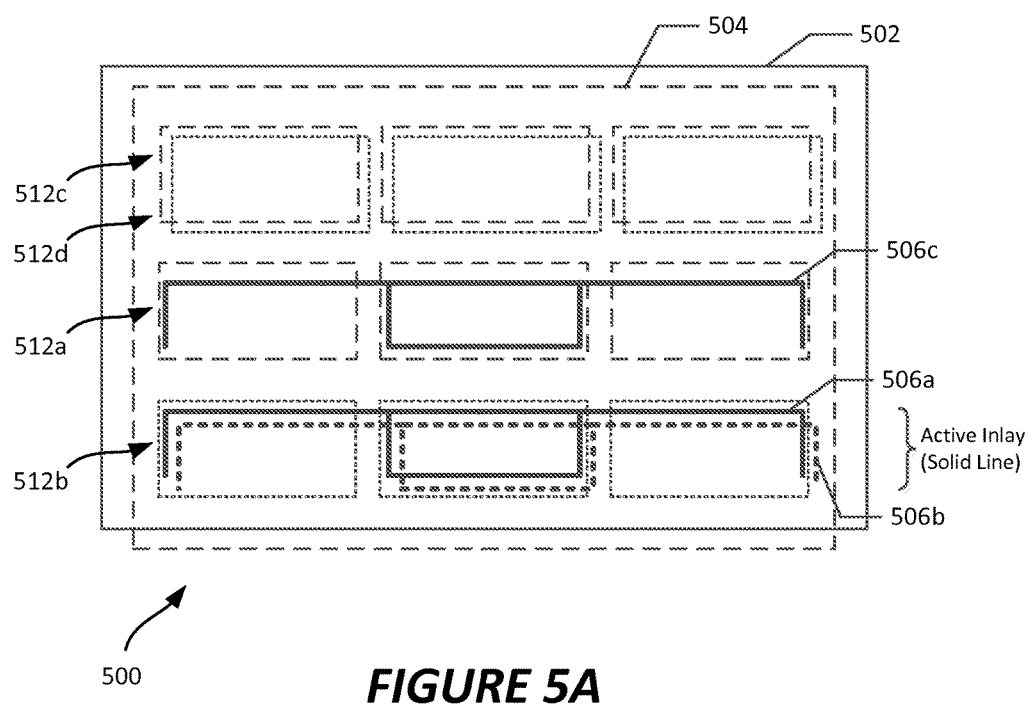
FIG. 5A depicts a schematic view of a stacked switchable RFID tag in a first position, according to an example embodiment of the present disclosure.
Figure 5B:
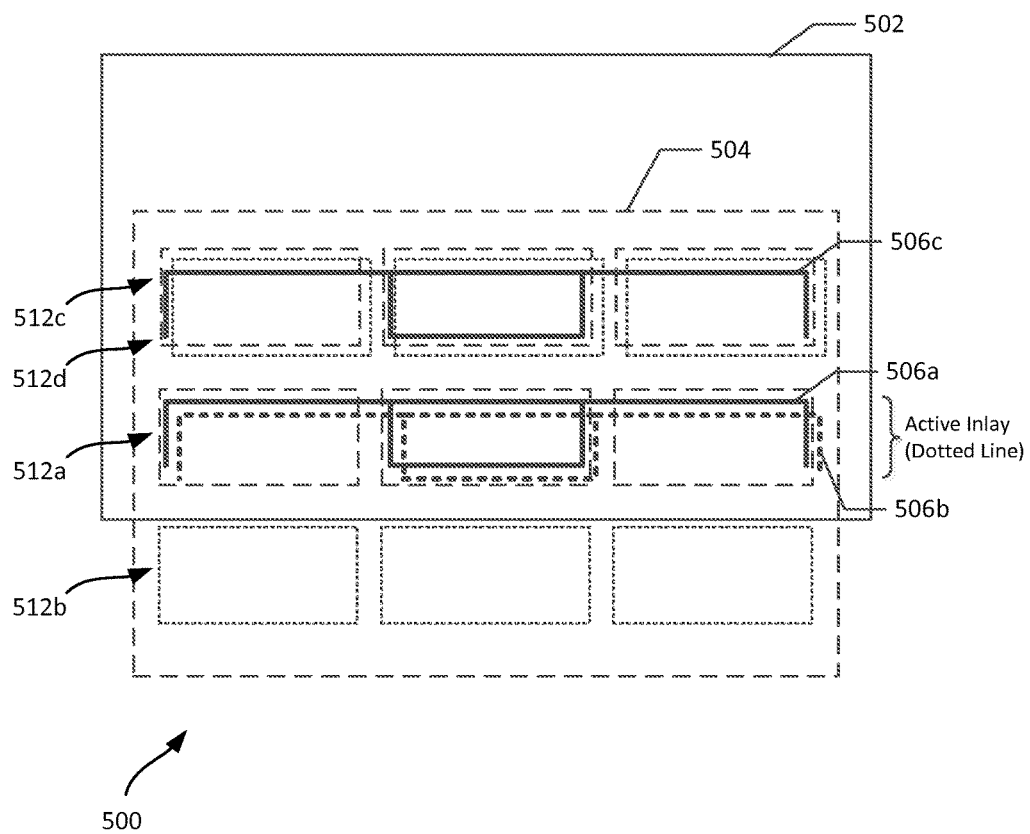
FIG. 5B depicts a schematic view of the stacked switchable RFID tag of FIG. 5A in a second position.
Figure 5C:
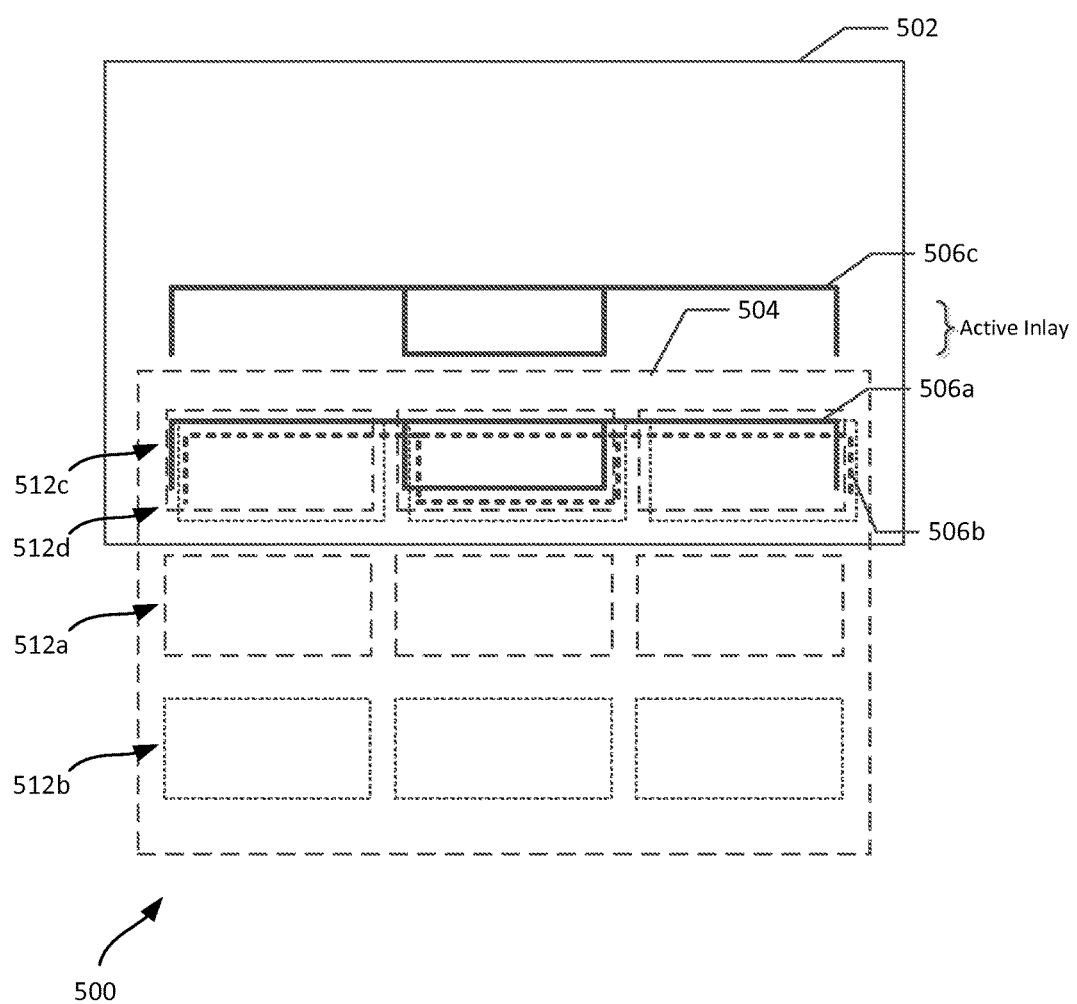
FIG. 5C depicts a schematic view of the stacked switchable RFID tag of FIG. 5A in a third position.
Figure 6A:
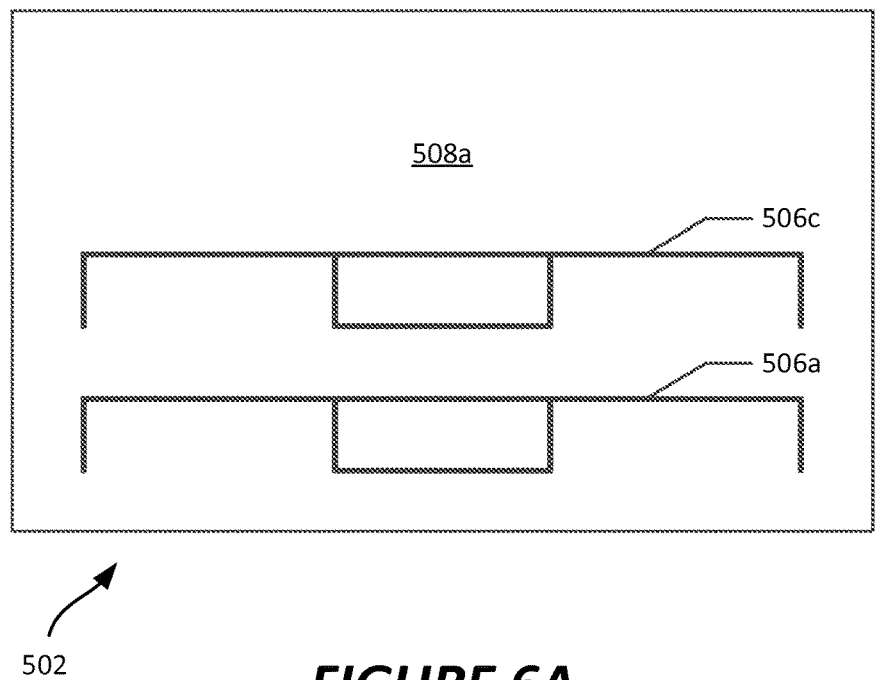
FIG. 6A depicts a schematic view of a first surface of the stacked switchable tag of FIGS. 5A-5C.
Figure 6B:
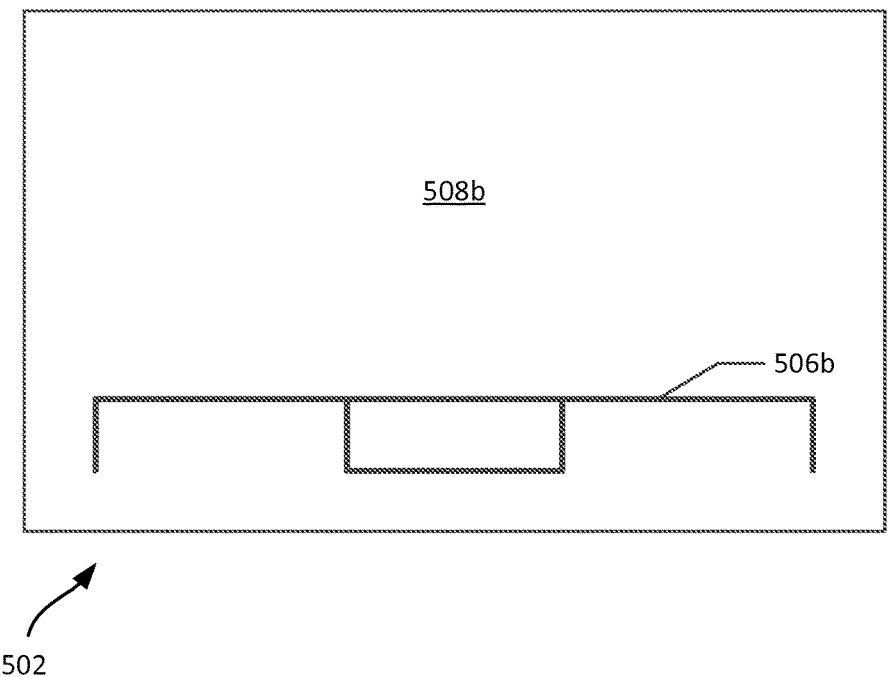
FIG. 6B depicts a schematic view of a second surface of the stacked switchable tag of FIGS. 5A-5C.

As compared to the embodiment illustrated in FIGS. 4A-4C, the RFID tag 500 includes a housing 502 and panel 504, which can, as discussed above, correspond to housing 302 and panel 304 of FIG. 3, above. In the embodiment shown in FIGS. 5A-5C, RFID inlays 506*a-c* are disclosed as disposed on a plurality of surfaces of the panel. Specifically, a first RFID inlay 506*a* is disposed on a first surface 508*a*, and a second RFID inlay 506*b* is disposed on a second surface 508*b*. In the embodiment shown, the first and second RFID inlays 506*a-b* are aligned on different surfaces, and spaced apart by a thickness of the panel 504. A third RFID inlay 506*c* is disposed on the first surface 508*a*, and is offset from the first RFID inlay 506*a*, analogous to the adjacent inlays 406*a-c* of FIGS. 4A-4C, above. Detailed schematic views of the surfaces 508*a-b* of the housing, illustrating relating placement of the RFID inlays 506*a-c*, are illustrated in FIG. 6A-6B.

The panel 504 includes first and second opposed surfaces 510*a-b*, which face surface 508*a-b* of the housing, respectively. In the embodiment shown, a plurality of RFID shorting structures 512*a-d* are disposed on the surfaces, and, analogous to the arrangement in FIGS. 4A-4B, provide a structure in which, at each of a plurality of positions of the panel 504 relative to the housing 502, a different one of the RFID inlays 506*a-c* is activated, with the remaining RFID inlays being deactivated, or shorted, using at least some of the RFID shorting structures 512*a-d*. In various embodiments, each of the shorting structures 512*a-d* correspond generally to shorting structures 412*a-c*, in that each includes a plurality of metallic components sized and positioned to create a capacitive coupling with portions of an RFID inlay when in alignment with that inlay, thereby causing that RFID inlay to appear transparent to RFID interrogation signals from an RFID reader.

In the embodiment shown, a first shorting structure 512*a* is positioned on a first surface 510*a* of the panel 504, and a second RFID shorting structure 512*b* is positioned on a second surface 510*b* of the panel 504, such that the first and second shorting structures 512*a-b* are offset from one another. As such, when the panel 504 is in a first position relative to the housing 502 as illustrated in FIG. 5A, the first RFID inlay 506*a* on a first surface 508*a* of the housing 502 is offset from the first shorting structure 512*a* on the first surface 510*a* of the panel 504, and the second RFID inlay 506*b* on second surface 508*b* of the housing 502 is aligned with the second shorting structure 512*b* on the second surface 510*b* of the panel 504. In comparison, when the panel 504 is in a second position relative to the housing 502 as illustrated in FIG. 5B, the first RFID inlay 506*a* on a first surface 508*a* of the housing 502 is aligned with the first shorting structure 512*a* on the first surface 510*a* of the panel 504, and the second RFID inlay 506*b* on second surface 508*b* of the housing 502 is offset from the second shorting structure 512*b* on the second surface 510*b* of the panel 504.

Figure 7A:
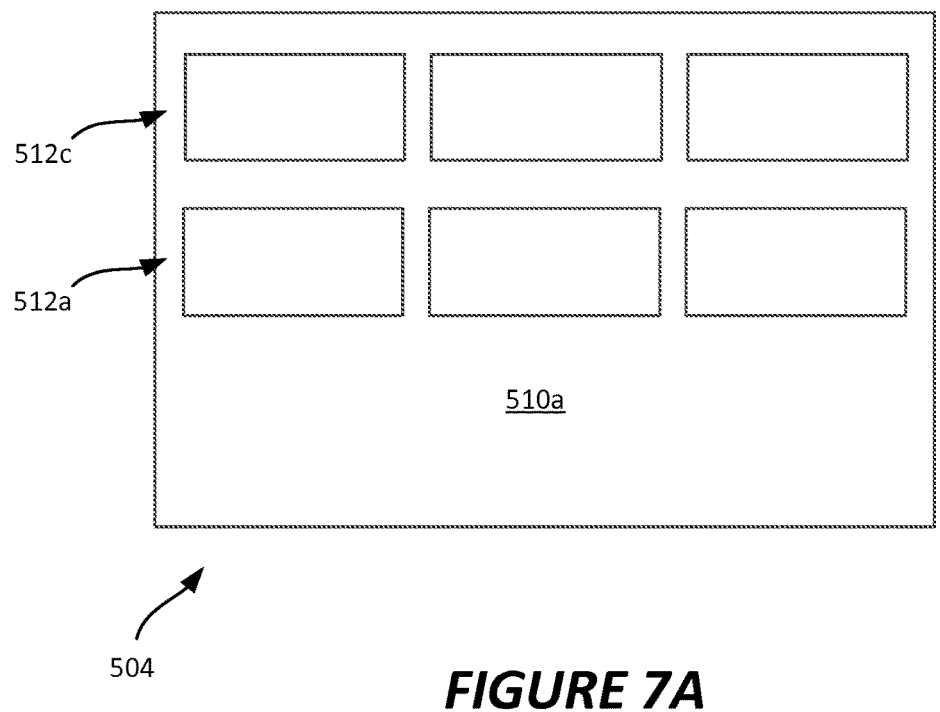
FIG. 7A depicts a schematic view of a first surface of a panel useable within the stacked switchable RFID tag of FIGS. 5A-5C, facing the first surface of FIG. 6A.
Figure 7B:
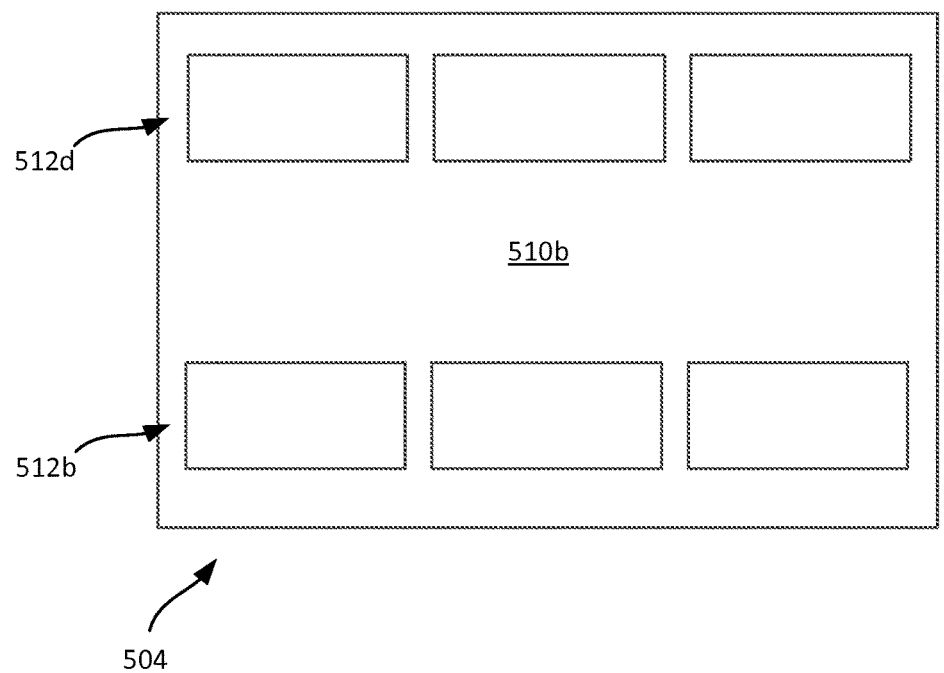
FIG. 7B depicts a schematic view of a second surface of a panel useable within the stacked switchable RFID tag of FIGS. 5A-5C, facing the second surface of FIG. 6B.

In the embodiment shown, the RFID tag 500 includes third and fourth RFID shorting structures 512*c-d* that are positioned on first and second surfaces 510*a-b* of the panel 504, respectively. The third and fourth RFID shorting structures 512*c-d* generally act to short both the first and second RFID inlays 506*a-b* when the panel 504 is in a third position relative to the housing 502, as illustrated in FIG. 5C. In particular, third RFID shorting structure 512*c* is positioned on first surface 510*a* offset from the first shorting structure 512*a*, and fourth RFID shorting structure 512*d* is positioned on second surface 510*b* offset from the second RFID shorting structure 512*b* by an additional amount, such that the third and fourth RFID shorting structures 512*c-d* are aligned with each other on opposing sides of the panel 504. It is noted that, when the panel is in the first position as shown in FIG. 5A, the first RFID shorting structure 512*a* is positioned such that it is aligned with the third RFID inlay 506*c*. Detailed schematic views of the surfaces 510*a-b* of the panel 504, illustrating relating placement of the RFID shorting structures 512*a-d*, are illustrated in FIG. 7A-7B.

Referring to FIGS. 4-7 generally, it is recognized that although in the embodiments shown the RFID inlays are depicted as disposed on surfaces of the housing and the RFID shorting structures are depicted as disposed on surfaces of a movable panel, in various alternative embodiments, one or more RFID inlays could equivalently be disposed on the movable panel, and one or more RFID shorting structures could be disposed on the housing, or some mixture thereof As such, where it is indicated herein that a structure on which the RFID shorting structures are disposed is movable relative to the RFID inlays, it is recognized that equivalently, the RFID inlays could be disposed on the structure that is in fact moved by a user, while the portion of the tag on which the RFID shorting structures are disposed could remain relatively stationary.

Furthermore, it is noted that the embodiments disclosed herein correspond to arrangements in which an RFID inlay remains active in each position of the panel relative to the housing of the RFID tag. In some alternative embodiments, it is possible that at least one position of housing and panel exists in which all RFID tags are shorted, and the tag is entirely transparent, or nonresponsive, to interrogation signals from an RFID reader.

Furthermore, and referring back to FIG. 3, in the embodiments discussed above in connection with FIGS. 4-7, metallic structures are formed on the first and second surfaces 306*a-b*, 308*a-b* of the RFID housing 302 and the panel 304 to form RFID tag inlays and corresponding shorting structures. Such structures can be manufactured on the RFID tag using any of a variety of manufacturing processes. In an example method of construction, metallic layers can be included on the surfaces and protected using an electrically non-conducting coating, in some examples an approximately 3 mil thick Mylar (i.e., BoPET) coating. Other protective coatings can be used as well. However, as noted below, the coatings are generally sufficiently thin that at least a capacitive electrical connection can be formed between RFID inlays and shorting structures in the embodiments discussed herein.

Figure 8:
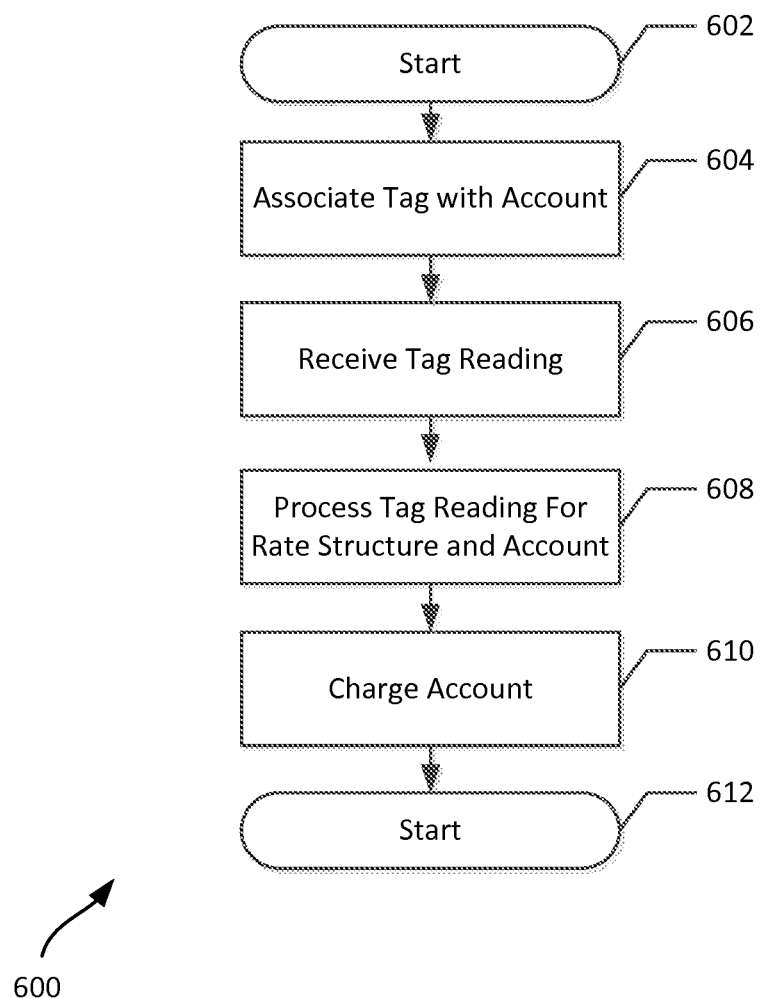
FIG. 8 is a flowchart of a method for using a switchable RFID tag within an example traffic control system, according to a possible embodiment of the present disclosure.

FIG. 8 is a flowchart of a method 600 for using a switchable RFID tag within an example traffic control system, according to a possible embodiment of the present disclosure. The method 600 can be performed by an RFID reader or RFID reader and associated back-office traffic control processing arrangement, such as may typically be installed within an environment 100 as illustrated in FIG. 1, in such an arrangement as may be implemented using a switchable RFID tag according to the various embodiments disclosed herein.

The method 600 is instantiated at a start operation 602, which corresponds to initial operation of an RFID reader within an environment in which switchable RFID tags are present. An association operation 604 corresponds to association of an RFID tag with a particular user account. The user account can be, for example, associated with a particular user or a particular vehicle, depending upon the specific implementation chosen. The association operation 604 further includes association of each of the possible response states of the RFID tag with a different response. The different responses can be, for example different rate structures at which the user of the RFID tag (as defined as the owner of the user account) is charged. For example, as discussed above in connection with FIG. 1, a user may elect to configure the tag in a first position to generate a first response if in a single occupancy vehicle, or may alternatively configure the tag in a second position to generate a second response if in a vehicle occupied by two people (e.g., an HOV vehicle), or a third position to generate a third response if the vehicle is carrying three people (e.g., an HOV3 vehicle). Other selections, such as payment plans or self-identification selections, are possible as well.

The method 600 continues at a tag reading receipt operation 606. The tag reading receipt operation 606 can occur in response to periodic interrogation of one or more tags that may be passing in the vicinity of a particular RFID reader, for example as associated with a vehicle passing an RFID reader associated with a lane in a traffic application. A tag processing operation 608 determines, based on the response received from the RFID tag, a particular rate structure and account that is associated with the RFID tag. A charging operation 610 then charges the identified user account associated with the tag reading, according to the option noted by the tag reading. For example, if the tag reading corresponds to a first response (meaning a first RFID inlay, such as inlay 406a or 506a, is active), a first rate structure will be charged to the user account. If the tag reading corresponds to a second response (meaning a second RFID inlay, such as inlay 406b or 506b, is active), a second rate structure will be charged to the user account. Similarly, if the tag reading corresponds to a third response (meaning a third RFID inlay, such as inlay 406c or 506c, is active), a third rate structure will be charged to the associated user account. Additional rate structures, corresponding to different RFID tag positions, could be used as well. An end operation 612 corresponds to completed processing of a single RFID response that is received at an RFID reader.

In the context of the present disclosure, it is recognized that the RFID reader will interrogate any tags located in the vicinity of that reader many times per second, and that the general interrogation and charging process reflected in method 600 can occur at various times, and in various orders. Although the steps 602-612 are illustrated herein as occurring in a particular order, it is recognized that, in certain embodiments, determination of the existence of violations occurring based on vehicle identifiers and locations could occur in a different order from that illustrated. Furthermore, one or more steps of the method 600 of FIG. 8 may be entirely optional, and need not be present within various embodiments. Additional operations may also be incorporated into the method 600 shown in FIG. 8, consistent with the present disclosure.

Referring to FIGS. 1-8 overall, it is recognized that the switchable RFID tags provide a number of advantages over previous tags when implemented within an identification environment such as the traffic application discussed herein. For example, the RFID tags can be used to identify two or more states of an object being tracked, such that an RFID reader can respond differently to each state, while recogniz-ing both states are associated with a particular user or object. Furthermore, the stacked switchable RFID tag disclosed in connection with FIGS. 5-7 provides a compact RFID tag arrangement, and a general solution for incorporating two or more states into a single RFID tag while avoiding some of the exponentially increasing size of the RFID tag that is attendant with additional RFID inlays and associated shorting structures, if positioned on the same surface.

Furthermore, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

The above specification, examples and data provide a complete description of the manufacture and use of example embodiments of the present disclosure. Many embodiments of the disclosure can be made without departing from the spirit and scope of the disclosure.

The invention claimed is:

1. An ultra high frequency (UHF) RFID tag comprising:
a first RFID inlay disposed on a first surface;
a second RFID inlay disposed on a second surface spaced apart from the first surface, the first and second RFID inlays,
a third RFID inlay disposed on the first surface, spaced apart from the first RFID inlay;
a panel movable between first, second, and third positions relative to the first and second surfaces, the panel including:
a first side facing the first surface;
a second side facing the second surface;
a first RFID shorting structure disposed on the first side;
a second RFID shorting structure disposed on the second side and offset from the first RFID structure such that, when the panel is in the first position, the first RFID shorting structure is offset from the first RFID inlay and the second RFID shorting structure is aligned with the second RFID inlay, and in the second position, the second RFID shorting structure is offset from the second RFID inlay and the first RFID shorting structure is aligned with the first RFID inlay;
a third RFID shorting structure positioned on the first side and offset from the first RFID shorting structure such that, when the panel is in the third position, the third RFID shorting structure is aligned with the first RFID inlay; and
a fourth RFID shorting structure positioned on the second side and offset from the second RFID shorting structure such that, when the panel is in the third position, the second RFID shorting structure is aligned with the second RFID inlay,
wherein, when the panel is in the first position, the first RFID shorting structure is aligned with the third RFID inlay.

2. The UHF RFID tolling tag of claim 1, wherein the first RFID shorting structure includes a shorting bar having a plurality of metallic pads, the metallic pads each arranged to electrically short a region of the first RFID inlay when aligned with the first RFID inlay.

3. The UHF RFID tolling tag of claim 2, wherein, when the panel is in the first position, the second RFID shorting structure is electrically connected to the second RFID inlay and the first RFID shorting structure is not electrically connected to the first RFID inlay.

4. The UHF RFID tolling tag of claim 3, wherein, when the panel is in the second position, the first RFID shorting structure is electrically connected to the first RFID inlay and the second RFID shorting structure is not electrically connected to the second RFID inlay.

5. The UHF RFID tolling tag of claim 1, wherein the panel has a thickness greater than or equal to about 5 millimeters.

6. The UHF RFID tolling tag of claim 1, wherein the panel is retained within a housing that includes the first and second surfaces, and is slidable between the first and second positions.

7. The UHF RFID tolling tag of claim 6, further comprising an affixation mechanism attached to the housing.

8. The UHF RFID tolling tag of claim 7, wherein the affixation mechanism comprises one or more suction cups.

9. The tag of claim 1, wherein the first and second RFID inlays are positioned in alignment with each other.

* * * * *